Feb. 26, 1946.  M. L. DEVOL  2,395,727

GLASS BENDING

Filed Jan. 2, 1943

INVENTOR
MANSON L. DEVOL
BY Olen E. Bee
ATTORNEY.

Patented Feb. 26, 1946

2,395,727

UNITED STATES PATENT OFFICE 2,395,727

GLASS BENDING

Manson L. Devol, Wilkinsburg, Pa., assignor to Pittsburgh Plate Glass Company, Allegheny County, Pa., a corporation of Pennsylvania Application January 2, 1943, Serial No. 471,122

5 Claims. (Cl. 49—67)

The present invention relates to apparatus for manipulating glass, and it has particular relation to apparatus for forming bends in plate or sheet glass.

One object of the invention is to provide an apparatus for bending glass plates and sheets, the use of which obviates or substantially reduces marring and distortion of the surface of the glass.

A second object is to provide an apparatus for bending glass in which a single form is applicable to the bending of a large number of sheets or plates without replacement.

These and other objects of the invention will be apparent from consideration of the following specification and the appended claims.

It has heretofore been proposed to bend glass sheets and plates by supporting them over a mold concavity of desired contours, formed in a bed of sand and then gradually heating them until they softened and sagged to assume the surface outlines of the mold. Such process was not satisfactory because of the necessity of reforming or reshaping the mold after each molding operation. Also the resultant bent bodies were by no means perfect and frequently were substantially distorted from the desired outlines.

It has, further, been proposed to bend glass sheets or plates by heating a flat blank of the glass to the softening temperature and then forming it by allowing it to settle over a permanent form of heat-resistant material, such as steel or the like. In some cases the glass sheet was held or suspended between two mold sections, one being concave and the other convex, and then was bent by bringing the mold surfaces together. Such process was not satisfactory because the soft glass tended to cling to the metal surfaces or was likely to be scarred or otherwise distorted to an objectionable degree.

The present invention is based upon the provision of a permanent mold including a mold surface formed of a porous or permeable material through which a gas, such as air or nitrogen, is gently forced in such manner as to provide a clinging cushioning film of gas upon the mold surfaces. These films prevent contact between the surface of the glass and the surface of the mold, although allowing an approach between the surfaces to within a small fraction about a thirty-second ($\frac{1}{32}$) of an inch. The air films prevent marring and scoring of the glass surface and also prevent the mold surface from being exposed to excessive heat.

Figure 1:
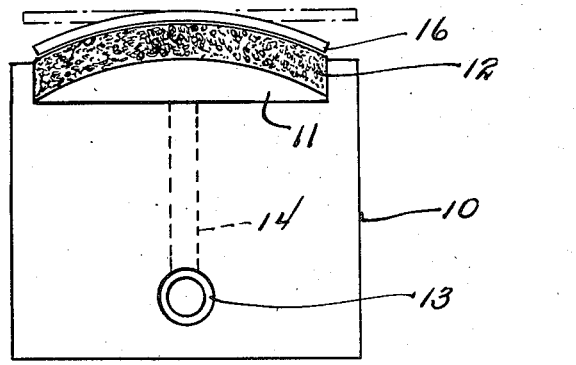
Figure 2:
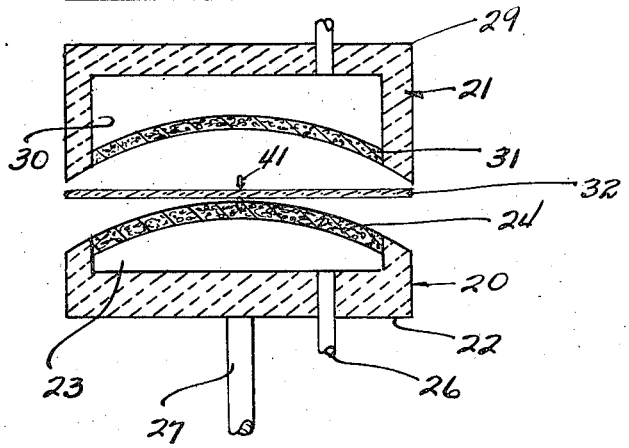

For a better understanding of the invention reference may now be had to the accompanying drawing in which Fig. 1 illustrates diagrammatically a convenient embodiment of the invention in a highly simplified form;

Fig. 2 illustrates diagrammatically a second form of the invention.

In the drawing like numerals refer to like parts throughout.

The invention as shown in Fig. 1 embodies a simple base 10, which may be formed of a refractory material, such as heat-resistant steel or other substance susceptible of withstanding considerable temperatures. This base is provided upon its upper surface with a recess 11, which receives plates 12 of sintered powdered metal; e. g., powdered stainless steel, carborundum, graphite, silica or the like material. The powder-like particles are bonded together in such manner as to leave minute interstices forming highly tortuous channels through which a gaseous medium, such as air or the like, can be forced, however, only with very considerable pressure drop. The plate 12 closes the recess 11 to provide in effect a windchest or box which is fed with a gas by means of a conduit 13 communicating through passages 14 with the recess.

In the operation of this embodiment of the apparatus a plate 16 of glass, such as window glass or plate glass, is supported upon the convex surface of the member 12 while it is heated to such temperature that it will tend to sag under its own weight into proximity to the surface of the plate. The heating operation may be performed while the glass is upon the block, for example, by inserting the block with the glass upon it in a suitable furnace. It is also permissible to preheat the plate or sheet in a suitable furnace approximately to the bending temperature or slightly above and then to superpose it gently upon the surface of the plate 12.

In order to prevent contact between the glass and the porous member 12, air or nitrogen is fed through the conduit 13 to the concavity 11. Pressure is relatively gentle, for example, of the order of 1 or 2 pounds, or even less. This pressure is sufficient to force the medium through the pores of the plate 12 and form a film upon the upper surface of the latter without any appreciable blast of gas away from the surface. Probably the pressure at the surface and beneath the glass is a small fraction of a pound and in effect constitutes a mere gaseous film, about $\frac{1}{32}$ inch thick, which clings to the surface and provides a cushion upon which the glass actually rides without substantial contact with the surface of the plate.

An apparatus embodying two mating mold sections 20 and 21 are shown in Fig. 2. These sections may be disposed to bend either vertically or horizontally disposed sheets, but for purposes of illustration are shown for bending sheets disposed in a vertical plane. The section 20 is similar to the construction in Fig. 1 and includes a base 22 having a cavity 23, closed by a porous plate 24 similar to the plate 12. The space within the cavity constitutes a gas or wind chamber, which is supplied with medium such as nitrogen under slight pressure by means of a conduit 26.

Base portion 22 is further provided with a piston rod 27, which is disposed in a suitable cylinder, whereby it may be reciprocated to effect bending operation. The mold section 21 is concave and includes a base portion 29 with chamber 30 closed by a porous plate 31. The latter in this case is so disposed as to register with the plate 24 when the two sections are brought into proximity to each other.

A glass plate to be bent is indicated at 32 in Fig. 2 of the drawing. This plate is supported by conventional tongs. It is to be observed that only a single set of tongs is employed and this one is disposed approximately at the center of the sheet of glass, so as to leave the lateral edges free to move during the bending operation. The tongs may be as indicated at Fig. 2 including a plurality of glass gripping points 41, which are designed to increase the security of the grip upon the plate.

The forms of the invention herein shown and described are to be regarded merely as exemplary. It will be apparent to those skilled in the art that numerous modifications may be made therein without departure from the spirit of the invention or the scope of the appended claims.

What I claim is:

1. A mold for bending a plate of glass, the glass being heated to plastic, bendable state, said mold comprising a forming plate of a surface contour corresponding to that desired in the glass plate and being composed of a refractory powdered material, the particles of which are cohered to form a unitary body but between which particles there are intercommunicating interstices, providing highly tortuous channels rendering the body permeable to gases, said forming plate constituting a closure to a gas-containing chamber and a conduit communicating with the chamber for supplying gas under pressure to the chamber whereby to form thin films of quiescent gas between the mold surface and the glass plate.

2. A construction as defined in claim 1 in which there are two mold sections, one male and the other female disposed in registering relation and means to force the sections toward each other to bend a plate of glass therebetween.

3. Apparatus for bending glass plates comprising a mold member, the mold member comprising a chamber for a gas, a conduit connected to the chamber to supply gas under compression, said chamber being closed upon one side by a member providing a surface contacting with the glass plate and being composed of comminuted material resistant to the heat of glass heated to the bending state, the particles of comminuted material being bonded together to form intercommunicating interstices constituting highly tortuous channels, rendering said member permeable to gases in the chamber whereby the gases pass through the member to form a thin film of quiescent gas between the plate of glass to be bent and the member.

4. A construction as defined in claim 3 in which there are two mold members disposed in registering relation with respect to each other and means for moving one mold section toward the other in order to press a plate of glass disposed therebetween to conform to the mold surface.

5. Apparatus for supporting or defining the surface of a plate of glass which is heated to a state at which it is plastic, bendable, and easily marred, said apparatus comprising a plate member of a surface contour corresponding to that desired in the glass plate and being composed of a refractory powdered material, the particles of which are cohered to form a unitary body but between which particles there are intercommunicating interstices, providing highly tortuous channels rendering the plate member permeable to gases, said plate member being disposed as a closure upon an air chamber and a conduit communicating with the chamber for supplying air under pressure to the chamber whereby to form thin films of quiescent gas between the mold surface and the glass plate.

MANSON L. DEVOL.